(12) United States Patent
Akamine et al.

(10) Patent No.: US 12,123,939 B2
(45) Date of Patent: Oct. 22, 2024

(54) OBJECT TRACKING APPARATUS

(71) Applicant: DENSO CORPORATION, Kariya (JP)

(72) Inventors: Yusuke Akamine, Nisshin (JP); Takuya Takayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 371 days.

(21) Appl. No.: 17/659,154

(22) Filed: Apr. 13, 2022

(65) Prior Publication Data

US 2022/0236398 A1 Jul. 28, 2022

Related U.S. Application Data

(63) Continuation of application No. PCT/JP2020/038021, filed on Oct. 7, 2020.

(30) Foreign Application Priority Data

Oct. 15, 2019 (JP) .................................. 2019-188668

(51) Int. Cl.
*G01S 13/58* (2006.01)
*G01S 7/41* (2006.01)
*G01S 13/93* (2020.01)

(52) U.S. Cl.
CPC .............. *G01S 13/58* (2013.01); *G01S 7/415* (2013.01); *G01S 13/93* (2013.01)

(58) Field of Classification Search
CPC ........... G01S 13/58; G01S 7/415; G01S 13/93
(Continued)

(56) References Cited

U.S. PATENT DOCUMENTS 5,757,308 A * 5/1998 Lissel .................. G01S 13/931
342/111
8,686,894 B2 * 4/2014 Fukuda .................. G01S 13/64
342/107

(Continued)

FOREIGN PATENT DOCUMENTS

| EP | 1372000 A2 * | 12/2003 | ......... G01S 13/9029 |
| JP | 2000065921 A * | 3/2000 | ............. G01S 13/34 |
| JP | 2017090143 A * | 5/2017 | ........... G01S 13/343 |

OTHER PUBLICATIONS

Li, et al, "Multitarget Tracking with Doppler Ambiguity", IEEE Transactions on Aerospace and Electronic Systems, vol. 49, No. 4, Oct. 2013, pp. 2640-2656.

*Primary Examiner* — Nuzhat Pervin
(74) *Attorney, Agent, or Firm* — MASCHOFF BRENNAN (57) ABSTRACT

An object tracking apparatus acquires detection information from a sensor mounted to a moving body, detects an object, and calculates a distance, a relative velocity, and an orientation thereof. For the initially detected object, the apparatus calculates aliased velocities of which aliasing from the relative velocity is assumed, and generates target candidates corresponding to the aliased velocities. For each target candidate, the apparatus estimates a current state of the target candidate from a past state thereof and observation information, and selects the target candidate estimated to be a true target from the target candidates for the same object. The apparatus calculates, as a reference velocity, an aliased velocity of the relative velocity that is equal to or greater than a velocity lower-limit value and is most negative or smallest in magnitude. The apparatus calculates the aliased velocities being the reference velocity aliased 0 to n times in a positive direction.

14 Claims, 9 Drawing Sheets

(58) Field of Classification Search
USPC .......................................................... 342/90
See application file for complete search history.

(56) References Cited

U.S. PATENT DOCUMENTS

| | | | | |
|---|---|---|---|---|
| 10,048,366 | B1* | 8/2018 | Hong | G01S 13/723 |
| 10,054,680 | B2* | 8/2018 | Owirka | G01S 13/5242 |
| 10,062,181 | B1* | 8/2018 | Longhurst | G06T 7/13 |
| 10,634,766 | B2* | 4/2020 | Stachnik | G01S 13/931 |
| 11,209,284 | B2* | 12/2021 | Hwang | B60W 30/0956 |
| 11,262,448 | B2* | 3/2022 | Davis | G01S 13/87 |
| 11,448,746 | B2* | 9/2022 | Stachnik | G01S 7/2921 |
| 11,941,985 | B2* | 3/2024 | Sakai | G08G 1/161 |
| 2019/0120953 | A1* | 4/2019 | Takayama | G01S 13/345 |
| 2019/0315351 | A1* | 10/2019 | Smith | G06N 3/084 |
| 2019/0317219 | A1* | 10/2019 | Smith | G05D 1/0088 |
| 2019/0318206 | A1* | 10/2019 | Smith | G01S 17/86 |
| 2020/0057141 | A1* | 2/2020 | Kim | G01S 13/726 |
| 2021/0003695 | A1* | 1/2021 | Akamine | G01S 7/411 |
| 2021/0063561 | A1* | 3/2021 | Yamada | G01S 7/415 |
| 2021/0146932 | A1* | 5/2021 | Smith | G06N 3/084 |
| 2023/0133611 | A1* | 5/2023 | Smith | G05D 1/228 |
| | | | | 356/4.01 |
| 2023/0271615 | A1* | 8/2023 | Smith | G01S 17/89 |
| | | | | 701/23 |
| 2024/0115810 | A1* | 4/2024 | Schabbach | A61M 5/24 |

* cited by examiner

$$V_{obs} = V - 2V_{max} \cdot m$$

OBJECT TRACKING APPARATUS

CROSS-REFERENCE TO RELATED APPLICATION

The present application is a continuation application of International Application No. PCT/JP2020/038021, filed on Oct. 7, 2020, which claims priority to Japanese Patent Application No. 2019-188668, filed on Oct. 15, 2019. The contents of these applications are incorporated herein by reference in their entirety.

BACKGROUND

Technical Field

The present disclosure relates to an object tracking apparatus.

Related Art

An object tracking apparatus that tracks an object is known. In the object tracking apparatus, an object may be tracked based on observation by a radar apparatus. For example.
a relative velocity of the object may be determined from phase rotation of frequency components that are continuously detected for the same object.

SUMMARY

One aspect of the present disclosure is an object tracking apparatus that acquires detection information from a sensor that is mounted to a moving body, detects an object that is present in a vicinity of the moving body from the acquired detection information, and calculates a distance of the detected object, a relative velocity of the detected object, and an orientation of the detected object. For the object that is initially detected, the object tracking apparatus calculates a plurality of aliased velocities of which aliasing (folding) from the calculated relative velocity is assumed, and generates a plurality of target candidates that correspond to the plurality of aliased velocities. For each target candidate that is included in the generated plurality of target candidates, the object tracking apparatus estimates a current state of the target candidate from a past state of the target candidate and observation information that includes the calculated distance, the calculated relative velocity, and the calculated orientation. The object tracking apparatus selects the target candidate that is estimated to be a true target from the generated plurality of target candidates for the same object. The object tracking apparatus calculates, as a reference velocity, an aliased velocity of the calculated relative velocity that is equal to or greater than a velocity lower-limit value and is most negative or smallest in magnitude. The velocity lower-limit value is set based on a movement velocity of the moving body. The object tracking apparatus calculates the plurality of aliased velocities that are the calculated reference velocity that is aliased (folded) 0 to n times, n being a natural number, in a positive direction.

BRIEF DESCRIPTION OF THE DRAWINGS

In the accompanying drawings.

DESCRIPTION OF THE EMBODIMENTS

The following embodiments relate to an object tracking apparatus that tracks an object.

When an object is tracked based on observation by a radar apparatus, a relative velocity of the observed object may have ambiguity. For example, when a method in which the relative velocity may be determined from phase rotation of frequency components that are continuously detected regarding the same object is used, an actual phase may be $\varphi+2\pi \times m$ (m being an integer) in relation to a detected phase $\varphi$. The relative velocity cannot be identified.

In K. L I et al, 'Multitarget Tracking with Doppler Ambiguity,' IEEE TRANSACTIONS ON AEROSPACE AND ELECTRONIC SYSTEMS VOL. 49, NO. 4 Oct. 2013, a technology in which a plurality of targets are generated by a plurality of relative velocities being assumed, and a true relative velocity is identified through tracking of the plurality of generated targets is proposed. Specifically, a likelihood is calculated for each of the plurality of assumptions, and the assumption of which the likelihood is higher than that of others based on tracking is identified as the true relative velocity.

In the technology for identifying the true relative velocity described above, estimation accuracy regarding the true relative velocity increases with increase in the number of assumptions of the relative velocity. However, processing load may increase in correspondence to the increase in the number of assumptions. However, as a result of detailed examination by the inventors, an issue has been found in that, when the number of assumptions is decreased, the relative velocities of the number of assumptions may not include the true relative velocity. Furthermore, an issue has been found in that, when the number of assumptions is decreased, tracking of the object may not be able to be performed, and lack of recognition of the object may occur.

It is thus desired to preferably enable suppression of lack of recognition of an object while suppressing processing load.

A first exemplary embodiment of the present disclosure provides an object tracking apparatus that includes an acquiring unit, an object detecting unit, a distance calculating unit, a velocity calculating unit, an orientation calculating unit, a candidate generating unit, a state estimating unit, and a candidate selecting unit. The acquiring unit is configured to acquire detection information from a sensor that is mounted to a moving body. The object detecting unit is configured to detect an object that is present in a vicinity of the moving body from the detection information that is acquired by the acquiring unit. The distance calculating unit is configured to calculate a distance of the object that is detected by the object detecting unit. The velocity calculating unit is configured to calculate a relative velocity of the object that is detected by the object detecting unit. The orientation calculating unit is configured to calculate an orientation of the object that is detected by the object detecting unit.

For the object that is initially detected by the object detecting unit, the candidate generating unit is configured to calculate a plurality of aliased velocities of which aliasing (folding) from the relative velocity that is calculated by the velocity calculating unit is assumed, and is configured to generate a plurality of target candidates that correspond to the plurality of aliased velocities.

For each target candidate that is included in the plurality of target candidates that are generated by the candidate generating unit, the state estimating unit is configured to estimate a current state of the target candidate from a past state of the target candidate and observation information. The observation information includes the distance that is calculated by the distance calculating unit, the relative velocity that is calculated by the velocity calculating unit, and the orientation that is calculated by the orientation calculating unit. The candidate selecting unit is configured to select the target candidate that is estimated to be a true target from the plurality of target candidates that are generated for the same object by the candidate generating unit.

The candidate generating unit includes a reference velocity calculating unit and an aliased velocity calculating unit. The reference velocity calculating unit is configured to calculate, as a reference velocity, an aliased velocity of the relative velocity that is calculated by the velocity calculating unit that is equal to or greater than a velocity lower-limit value and is most negative or smallest in magnitude. The velocity lower-limit value is set based on a movement velocity of the moving body. The aliased velocity calculating unit is configured to calculate the plurality of aliased velocities that are the reference velocity that is calculated by the reference velocity calculating unit that is aliased (folded) 0 to n times, n being a natural number, in a positive direction.

The relative velocity of an object that is observed by a sensor changes based on the velocity of the object and the velocity of the moving body. An object that requires attention of the moving body is an object that is present in an advancing direction of the moving body. The relative velocity of the object that is present in the advancing direction of the moving body has a higher likelihood of increasing towards a negative side as the velocity of the moving body increases. That is, the relative velocity to be assumed changes based on the velocity of the moving body. In addition, an object that has a high risk of colliding with the moving body is required to be preferentially recognized. Therefore, when the number of velocity aliasings (foldings) is assumed, a relative velocity that is greatest towards the negative side among the relative velocities that may be observed is required to be included.

A second exemplary embodiment of the present disclosure provides an object tracking apparatus that includes a processor, a non-transitory computer-readable storage medium, and a set of computer-executable instructions stored on the computer-readable storage medium. When read and executed by the processor, the set of computer-executable instructions cause the processor to implement: acquiring detection information from a sensor that is mounted to a moving body; detecting an object that is present in a vicinity of the moving body from the acquired detection information; calculating a distance of the detected object, a relative velocity of the detected object, and an orientation of the detected object; calculating, for the object that is initially detected by the object detecting unit, a plurality of aliased velocities of which aliasing from the calculated relative velocity is assumed, and generating a plurality of target candidates that correspond to the plurality of aliased velocities; estimating, for each target candidate that is included in the generated plurality of target candidates, a current state of the target candidate from a past state of the target candidate and observation information that includes the calculated distance, the calculated relative velocity, and the calculated orientation; selecting the target candidate that is estimated to be a true target from the generated plurality of target candidates for a same object; calculating, as a reference velocity, an aliased velocity of the calculated relative velocity that is equal to or greater than a velocity lower-limit value and is most negative or smallest in magnitude, the velocity lower-limit value being set based on a movement velocity of the moving body; and calculating the plurality of aliased velocities that are the calculated reference velocity that is aliased 0 to n times, n being a natural number, in a positive direction.

A third exemplary embodiment of the present disclosure provides an object tracking method that includes: acquiring detection information from a sensor that is mounted to a moving body; detecting an object that is present in a vicinity of the moving body from the acquired detection information; calculating a distance of the detected object, a relative velocity of the detected object, and an orientation of the detected object; calculating, for the object that is initially detected by the object detecting unit, a plurality of aliased velocities of which aliasing from the calculated relative velocity is assumed, and generating a plurality of target candidates that correspond to the plurality of aliased velocities; estimating, for each target candidate that is included in the generated plurality of target candidates, a current state of the target candidate from a past state of the target candidate and observation information that includes the calculated distance, the calculated relative velocity, and the calculated orientation; selecting the target candidate that is estimated to be a true target from the generated plurality of target candidates for a same object; calculating, as a reference velocity, an aliased velocity of the calculated relative velocity that is equal to or greater than a velocity lower-limit value and is most negative or smallest in magnitude, the velocity lower-limit value being set based on a movement velocity of the moving body; and calculating the plurality of aliased velocities that are the calculated reference velocity that is aliased 0 to n times, n being a natural number, in a positive direction.

Therefore, in the object tracking apparatus according to the first to third exemplary embodiments of the present disclosure, an aliased velocity that is equal to or less than the velocity lower-limit value that is set based on the velocity of the moving body and is most negative or smallest in magnitude is calculated as the reference velocity. Moreover, the plurality of aliased velocities that are the reference velocity that is aliased in the positive direction are calculated, and the plurality of target candidates that correspond to the plurality of aliased velocities are generated. As a result, the plurality of aliased velocities over an appropriate range based on the velocity of the vehicle can be calculated. Consequently, estimation accuracy regarding a true relative velocity can be improved while processing load is suppressed. Furthermore, lack of recognition of an object can be suppressed while processing load is suppressed.

An embodiment for implementing the present disclosure will hereinafter be described with reference to the drawings.

<1. Configuration>

Figure 1:
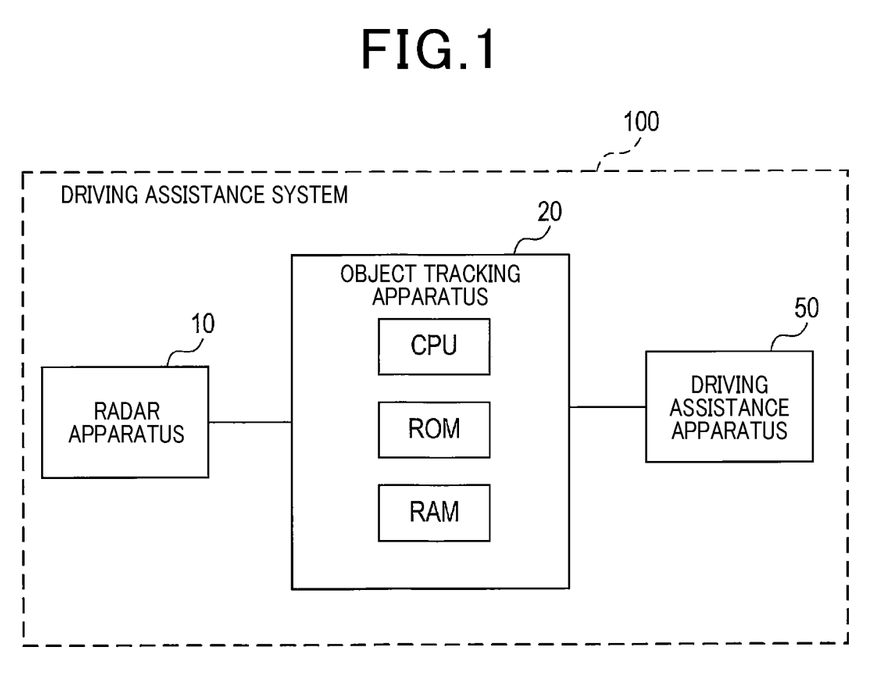
FIG. 1 is a block diagram illustrating a configuration of an object tracking apparatus according to a present embodiment.

First, a configuration of a driving assistance system 100 according to the present embodiment will be described with reference to FIG. 1. The driving assistance system 100 includes a radar apparatus 10, an object tracking apparatus 20, and a driving assistance apparatus 50.

The radar apparatus 10 may be mounted in a front center (such as a center of a front bumper) of a vehicle 80, and have an area that is centered and in front of the vehicle 80 as a detection area. In addition, the radar apparatus 10 may be mounted in each of a front left side and a front right side (such as a left end and a right end of the front bumper) of the vehicle 80, and have areas on the front left side and the front right side of the vehicle 80 as the detection areas.

Furthermore, the radar apparatus 10 may be mounted in each of a rear left side and a rear right side (such as a left end and a right end of a rear bumper) of the vehicle 80, and have areas on the rear left side and the rear right side of the vehicle 80 as the detection areas. Not all five of these radar apparatuses 10 need be mounted to the vehicle 80. Only one of the five radar apparatuses 10 may be mounted to the vehicle 80. Alternatively, two or more of the five radar apparatuses 10 may be mounted to the vehicle 80. Here, the radar apparatus 10 corresponds to a sensor of the present disclosure. The vehicle 80 corresponds to a moving body of the present disclosure.

The radar apparatus 10 is a millimeter-wave radar. The radar apparatus 10 includes a transmission array antenna that includes a plurality of antenna elements and a reception array antenna that includes a plurality of antenna elements. The radar apparatus 10 repeatedly transmits transmission waves at a predetermined cycle and received reflected waves that are generated by the transmission waves being reflected by an object. Furthermore, the radar apparatus 10 combines the transmission wave and the reflected wave and generates a beat signal, and outputs sampled beat signals (that is, detection information) to the object tracking apparatus 20. The radar apparatus 10 is a modulation-type radar in which observation velocity has ambiguity, such as a Fast Chirp Modulation (FCM)-type radar.

Figure 2:
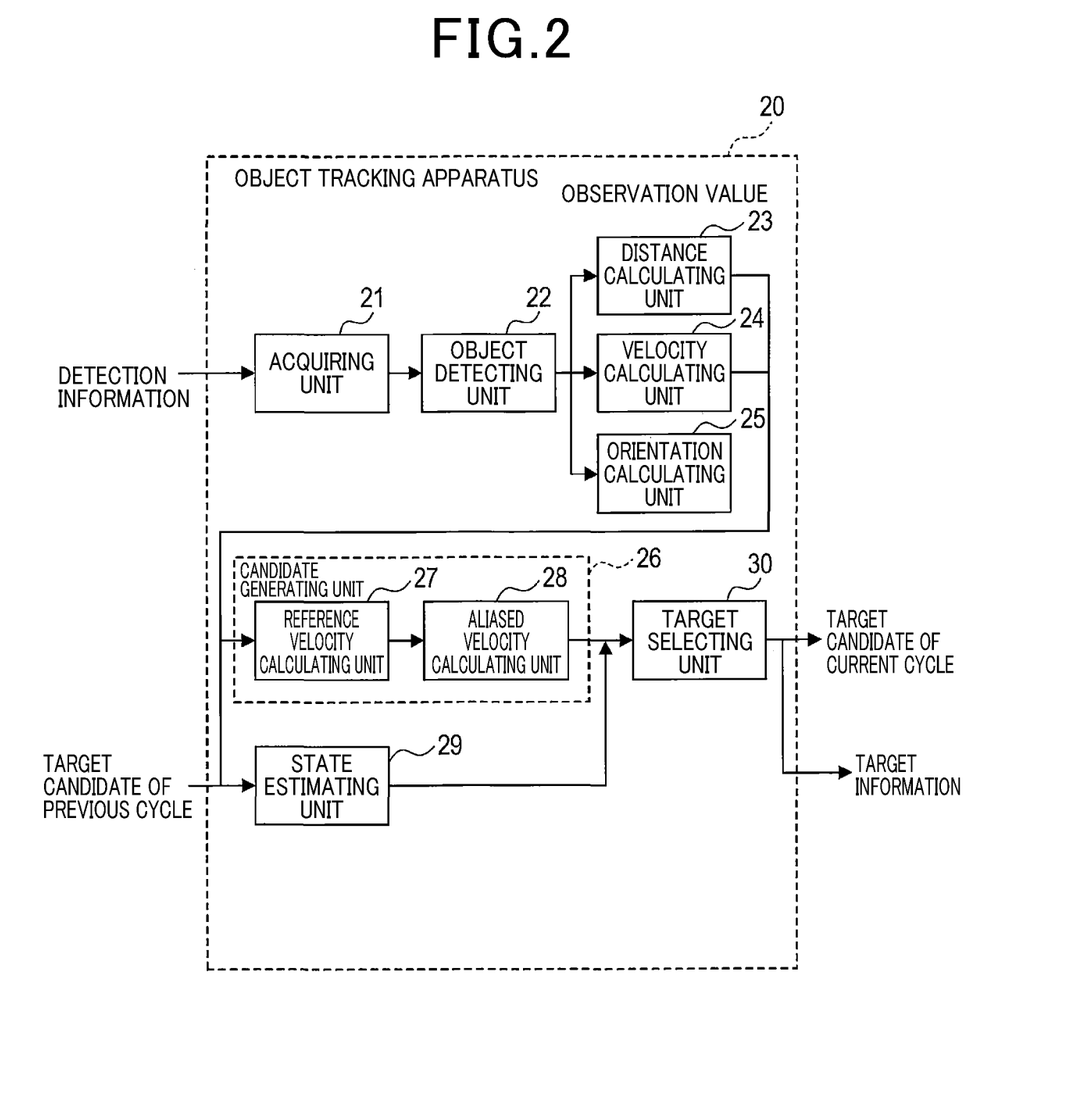
FIG. 2 is a block diagram illustrating functions of the object tracking apparatus according to the present embodiment.

The object tracking apparatus 20 includes a microcomputer that has a central processing unit (CPU) and a semiconductor memory such as a read-only memory (ROM) or a random access memory (RAM). The object tracking apparatus 20 actualizes various functions by the CPU running various programs that are stored in the ROM. Specifically, as shown in FIG. 2, the object tracking apparatus 20 provides functions of an acquiring unit 21, an object detecting unit 22, a distance calculating unit 23, a velocity calculating unit 24, an orientation calculating unit 25, a candidate generating unit 26, a state estimating unit 29, and a target selecting unit 30. The candidate generating unit 26 includes functions of a reference velocity calculating unit 27 and an aliased velocity calculating unit 28. The object tracking apparatus 20 performs an object tracking process and outputs target information that is generated through execution of the object tracking process to the driving assistance apparatus 50. Here, details of the object tracking process will be described hereafter.

The driving assistance apparatus 50 controls the vehicle 80 and actualizes driving assistance using the target information that is generated by the object tracking apparatus 20, and state information and behavior information of the vehicle 80 that are acquired from various sensors that are mounted to the vehicle 80.

<2. Processes>

Figure 3:
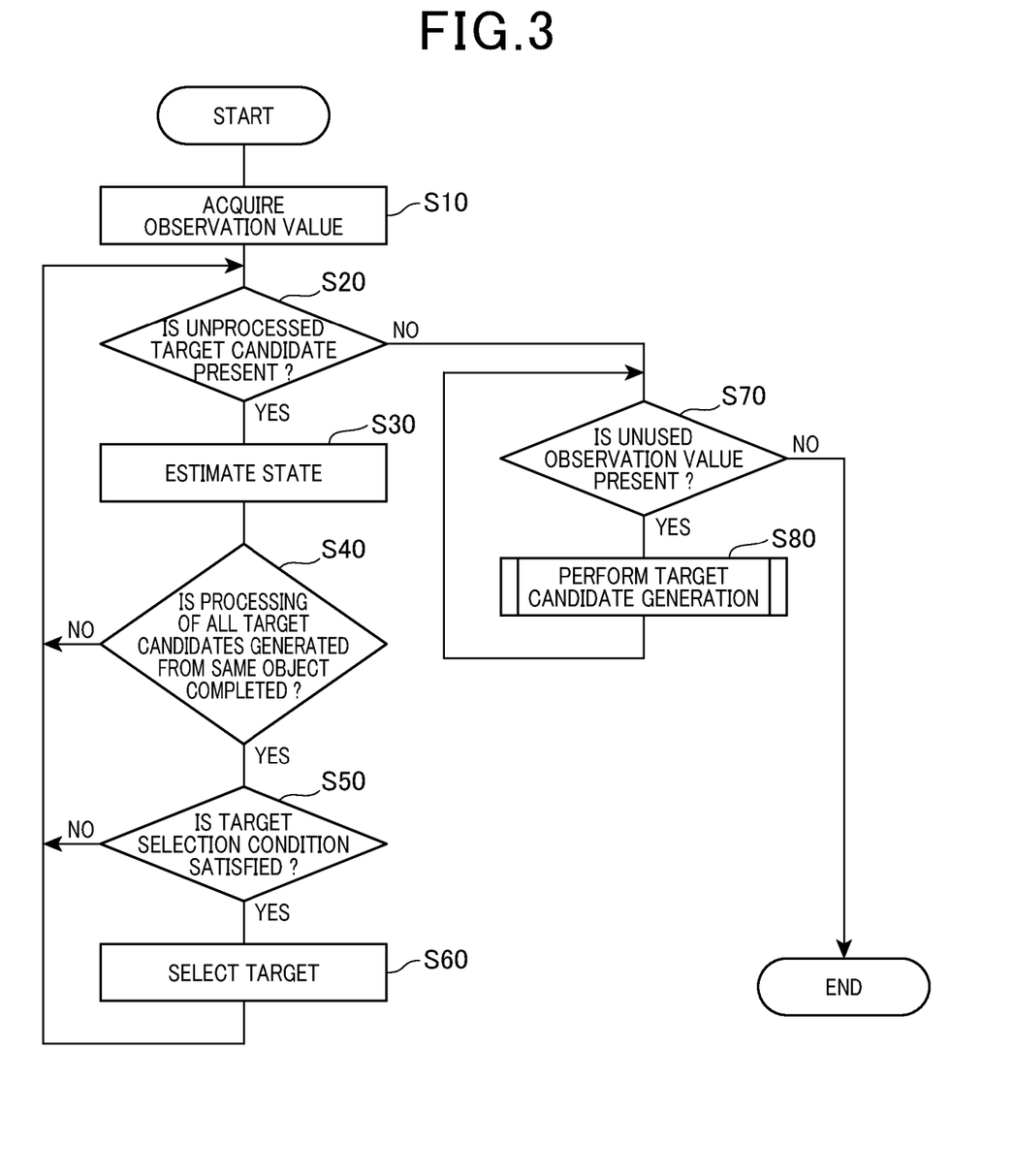
FIG. 3 is a flowchart illustrating an object tracking process performed by the object tracking apparatus according to the present embodiment.

Next, the object tracking process performed by the object tracking apparatus 20 according to the first embodiment will be described with reference to a flowchart in FIG. 3. The object tracking apparatus 20 repeatedly performs the present process at a predetermined cycle.

Figure 5:
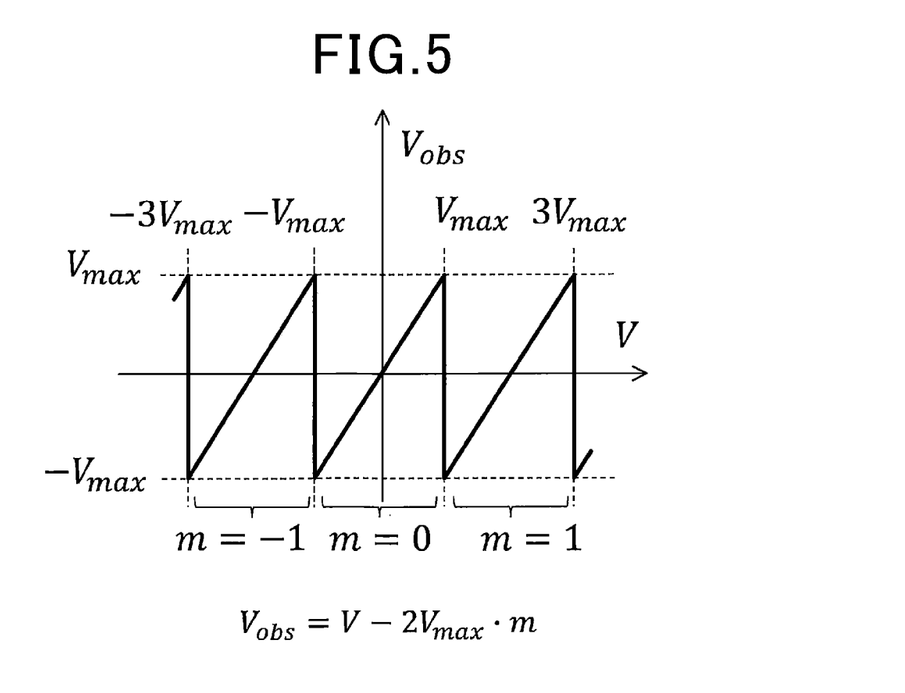
FIG. 5 is a diagram illustrating an aliased velocity.

First, at S10, the object detecting unit 22 detects at least one object that is present in a vicinity of the vehicle 80 from the detection information that is acquired by the acquiring unit 21. Furthermore, for each detected object, the distance calculating unit 23 calculates a distance of the detected object, and the velocity calculating unit 24 calculates a relative velocity Vobs of the detected object. In addition, for each detected object, the orientation calculating unit 25 calculates an orientation of the detected object. The distance of the object is a distance from the vehicle 80 to the object and the relative velocity Vobs of the object is a velocity of the object in relation to the vehicle 80. In addition, the orientation of the object is an orientation of the object in relation to the vehicle 80. Here, as shown in FIG. 5, the relative velocity Vobs calculated herein has ambiguity due to velocity aliasing (folding).

Next, at S20, the state estimating unit 29 determines whether unprocessed target information is present. Specifically, the state estimating unit 29 determines whether a target candidate for which subsequent processes at S30 to S60 that follow have not been performed is present among registered target candidates. When determined that an unprocessed target candidate is present at S20, the state estimating unit 29 proceeds to S30.

At S30, for a single target candidate among the unprocessed target candidates, the state estimating unit 29 estimates a current state of the target candidate from a past state of the target candidate and observation values acquired at S10. Specifically, the state estimating unit 29 calculates a prediction value of a state quantity of the target candidate in a present processing cycle from an estimation value (that is, the past state) of the state quantity of the target candidate that is calculated in a previous processing cycle. In a manner similar to the observation values, the state quantity of the target may have the distance, the relative velocity, and the orientation of the target candidate as elements, or may have an X-axis coordinate value, a Y-axis coordinate value, an X-direction relative velocity, and a Y-direction relative velocity as the elements. The X-axis is an axis that runs along a width direction of the vehicle 80. The Y-axis is an axis that is orthogonal to the X-axis and runs along a length direction of the vehicle 80. In addition, the state quantity of the target may be elements other than the foregoing.

Furthermore, the state estimating unit 29 determines the observation value that is associated with the calculated prediction value from the observation values acquired at S10. Specifically, the state estimating unit 29 sets a predetermined range that is centered on the calculated prediction value, and determines an observation value that is within the predetermined range and closest to the prediction value as the observation value to be associated with the prediction value. The predetermined range is the range of observation values that are estimated to be acquired from the same object as the prediction value.

Then, the state estimating unit 29 calculates an estimation value (that is, a current state) in the present processing cycle using a Kalman filter or the like, from the calculated prediction value and the observation value that is determined to be associated.

In addition, the state estimating unit 29 calculates a likelihood of the calculated estimation value. When the estimation value is calculated from the prediction value and the observation value that is determined to be associated with the prediction value, the likelihood of the estimation value increases. At this time, the likelihood of the estimation value may increase as a difference between the prediction value and the observation value decreases. Moreover, when the observation value that is determined to be associated is not present and the estimation value is calculated from only the prediction value, the likelihood of the estimation value decreases.

Figure 6:
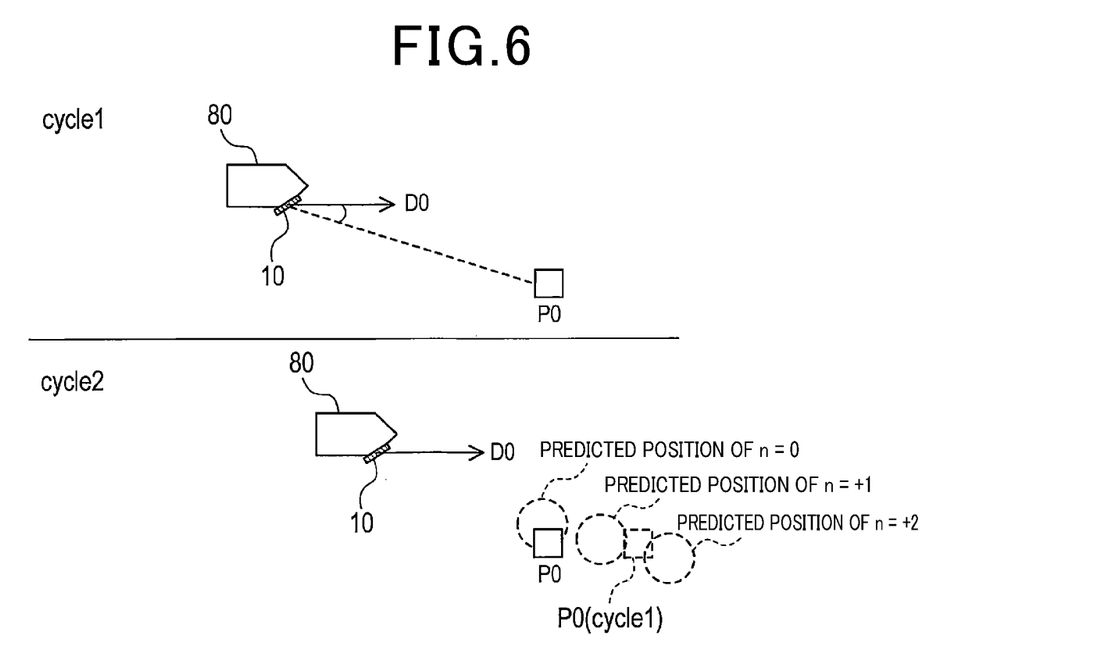
FIG. 6 is a diagram illustrating an aspect in which a plurality of target candidates are generated and an object is tracked.

Next, at S40, the target selecting unit 30 determines whether processing of all target candidates that are generated from the same object is completed. That is, the target selecting unit 30 determines whether the estimation value of the state quantity is calculated for all target candidates that are generated from the same object. As shown in FIG. 5, the observation value of the relative speed Vobs acquired at S10 has ambiguity. Therefore, as shown in FIG. 6, a plurality of target candidates of which a plurality of aliased velocities are assumed are generated from the same object. According to the present embodiment, three target candidates of which three aliased velocities are assumed are generated from a single object P0.

Figure 7:
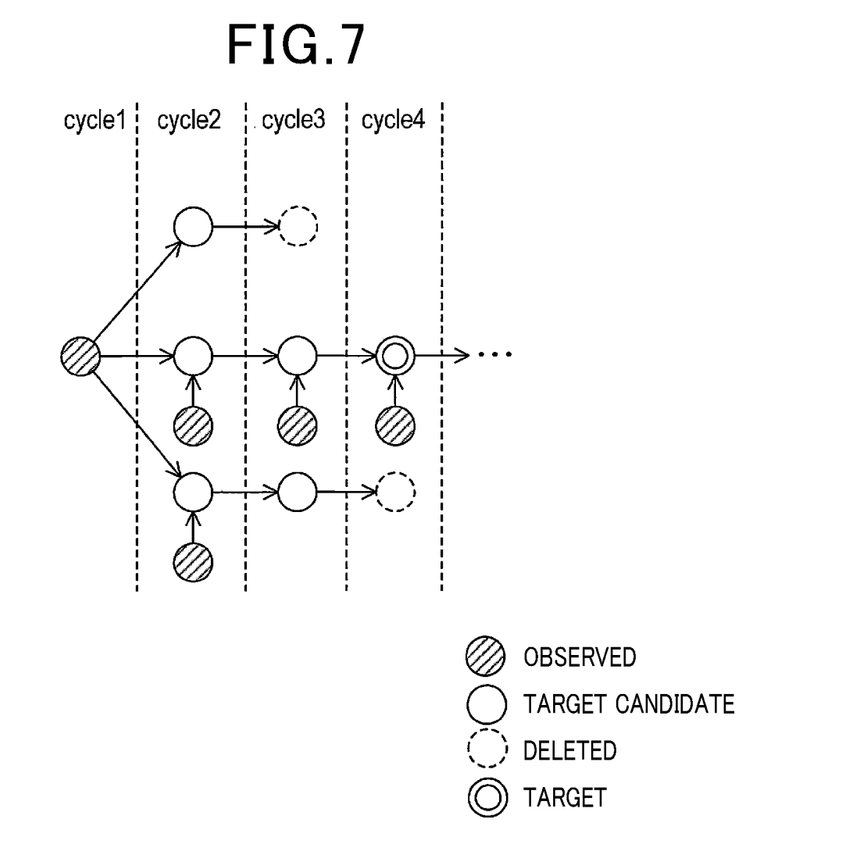
FIG. 7 is a diagram illustrating a process by which a target is selected from the plurality of target candidates.

As shown in FIGS. 6 and 7, when an observation value of the object P0 is initially detected in a processing cycle 1, in a processing cycle 2 and subsequent thereto, three target candidates are generated for the object P0 and each of the three target candidates are tracked. During tracking, the likelihood is increased for the estimation value of the target candidate that corresponds to the prediction value that is associated with the observation value. In an example shown in FIG. 6, the likelihood of the estimation value of the target candidate that corresponds to the number of aliasings that is n=0 is increased. In addition, during tracking, when the likelihood of the estimation value becomes equal to or less than a deletion threshold, the target candidate is deleted and the number of target candidates decreases.

Next, at S40, when determined that processing of all object candidates that are generated from the same object is not completed, the target selecting unit 30 returns to the process at S20. When determined that processing of all object candidates is completed, the target selecting unit 30 proceeds to S50.

At S50, the target selecting unit 30 determines whether any of the target candidates that are generated from the same object satisfies a selection condition. The selection condition is a condition for determining that the target candidate is a true target and, for example, may be the likelihood of the estimation value being equal to or greater than a selection threshold. When none of the target candidates satisfies the selection condition, the target selecting unit 30 returns to the process at S20. When any of the target candidates satisfies the selection condition, the target selecting unit 30 proceeds to S60.

As shown in FIG. 7, at S60, the target selecting unit 30 selects the target candidate that satisfies the selection condition as the true target and sets the target. When other target candidates that are generated from the same target remain, the target selecting unit 30 deletes the other target candidates. In a subsequent processing cycle, only the set target is tracked. In addition, the target selecting unit 30 transmits information on the set target to the driving assistance apparatus 50.

In addition, when determined that an unprocessed target candidate is not present at S20, the target selecting unit 30 proceeds to step S70.

At S70, the target candidate generating unit 26 determines whether an unused observation value is present among the observation values acquired at S10. That is, the target candidate generating unit 26 determines whether an observation value that is not associated with any of the prediction values is present among the observation values detected at S10. The unused observation value corresponds to an observation value of an object that is initially detected in the current processing cycle. When determined that an unused observation value is not present at S70, the target candidate generating unit 26 ends the present process. Meanwhile, when determined that the unused observation value is present at S70, the target candidate generating unit 26 proceeds to S80.

Figure 4:
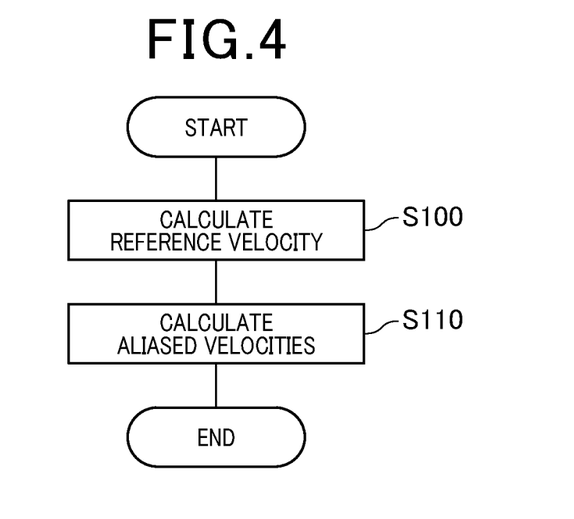
FIG. 4 is a flowchart illustrating a target candidate generation process performed by the object tracking apparatus according to the present embodiment.

Next, at S80, a target candidate is generated from one of the observation values among the unused observation values. That is, a plurality of target candidates of which a plurality of aliased velocities are assumed are generated for the object that is initially detected in the current processing cycle. Specifically, a flowchart shown in FIG. 4 is performed.

Figure 8:
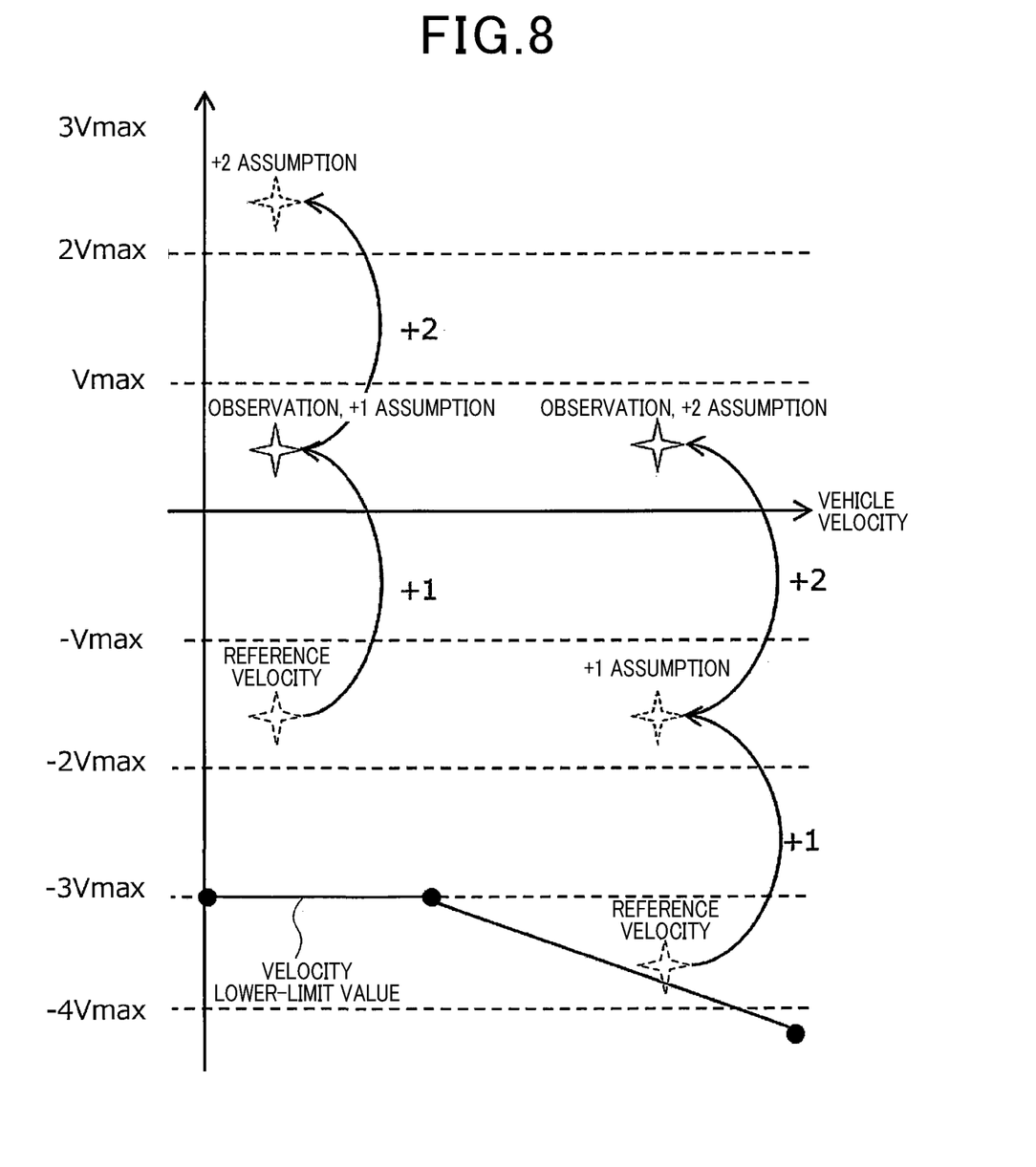
FIG. 8 is a diagram illustrating a velocity lower-limit value that is set for a vehicle velocity and a plurality of aliased velocities that are calculated in a range that is determined by the velocity lower-limit value.

First, at S100, the reference velocity calculating unit 27 calculates a reference velocity for generating the plurality of target candidates. Specifically, as shown in FIG. 8, the reference velocity calculating unit 27 calculates an aliased velocity that is equal to or greater than a velocity lower-limit value that is set based on a vehicle velocity of the vehicle 80 and is most negative or smallest in magnitude as the reference velocity using the observation value of the relative velocity Vobs.

Figure 10:
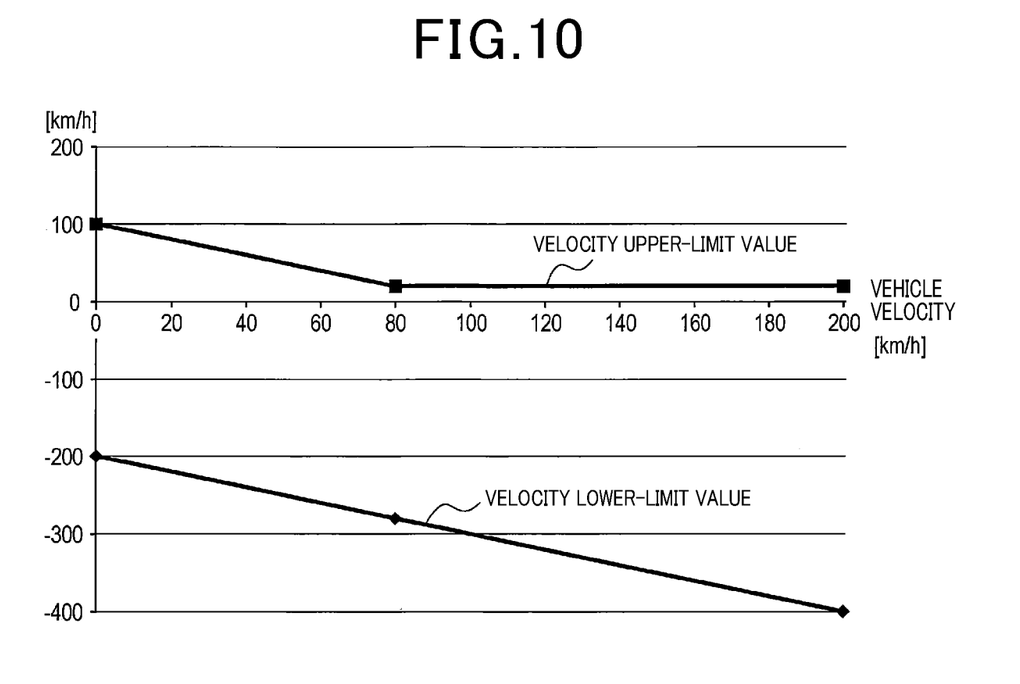
FIG. 10 is a diagram illustrating an example of the velocity lower-limit value and the velocity upper-limit value that are set for the vehicle velocity.
Figure 11:
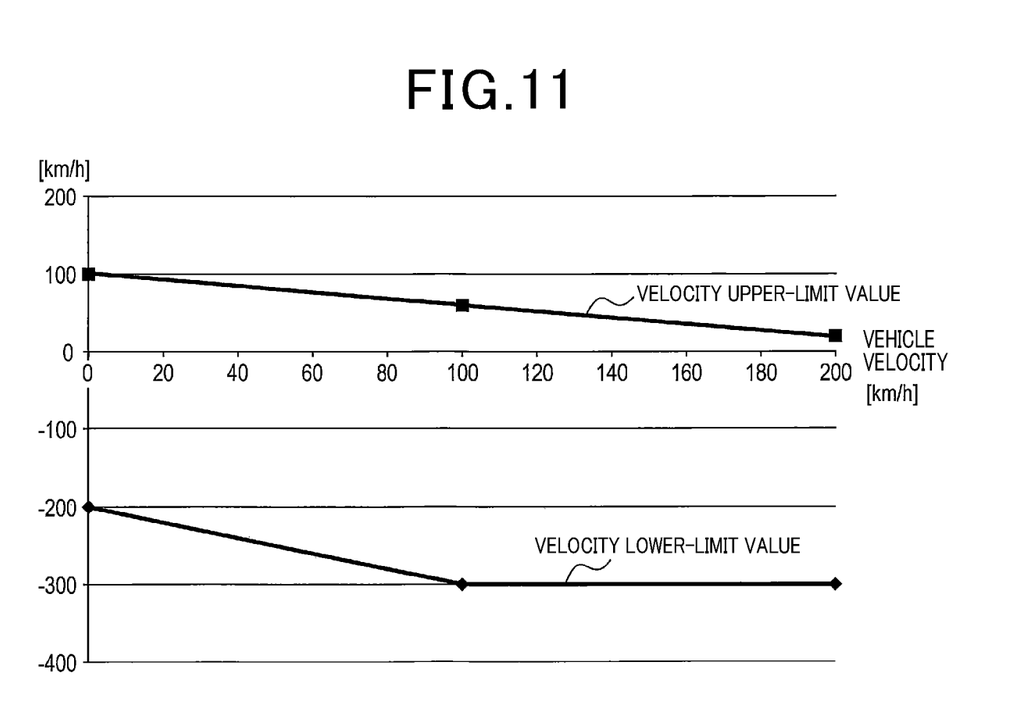
FIG. 11 is a diagram illustrating an example of the velocity lower-limit value and a velocity upper-limit value that are set for the vehicle velocity.

Here, at least an object that is approaching the vehicle 80 is preferably recognizable. Therefore, as shown in FIGS. 9 to 11, the velocity lower-limit value is set to a negative value.

Furthermore, a stationary object is preferably recognizable. The relative velocity of a stationary object is a negative value of the vehicle velocity of the vehicle 80. Here, as shown in FIGS. 9 to 11, the velocity lower-limit value is set to be equal to or less than the negative value of the vehicle velocity of the vehicle 80.

In addition, among the objects that are present in the vicinity of the vehicle 80, in particular, an object that may collide with the vehicle 80 is preferably recognizable. Here, as shown in FIGS. 9 to 11, the velocity lower-limit value is set so as to decrease with increase in the vehicle velocity of the vehicle 80. Furthermore, the velocity lower-limit value has a portion that is inversely proportional to the vehicle velocity of the vehicle 80 in a corresponding relationship between the vehicle velocity of the vehicle 80 and the velocity lower-limit value.

Figure 9:
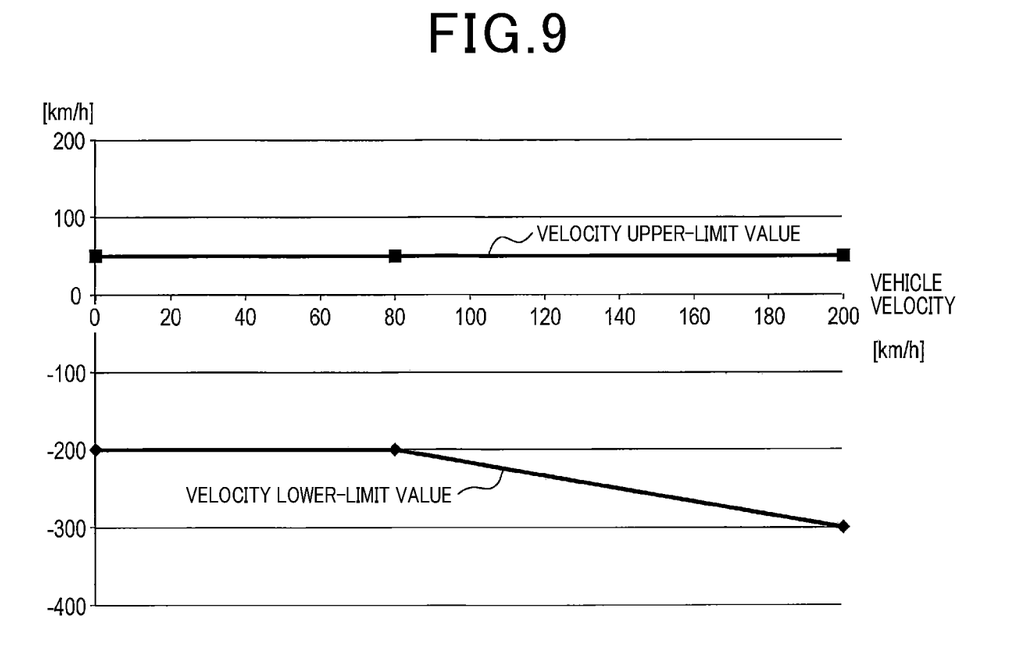
FIG. 9 is a diagram illustrating an example of the velocity lower-limit value and a velocity upper-limit value that are set for the vehicle velocity.

For example, as shown in FIG. 9, the correspondence relationship may have a fixed portion in which the velocity lower-limit value is set so as to be fixed for a vehicle velocity that is less than a first velocity (such as 80 km/h), and an inversely proportional portion in which the velocity lower-limit value is set so as to decrease with increase in the vehicle velocity for a vehicle velocity that is equal to or greater than the first velocity.

In addition, as shown in FIG. 10, the corresponding relationship may have an inversely proportional portion in which the velocity lower-limit value is set so as to decrease with increase in the vehicle velocity over an overall range of the vehicle velocity.

Furthermore, as shown in FIG. 11, the corresponding relationship may have an inversely proportional portion in which the velocity lower-limit value is set so as to decrease with increase in the vehicle velocity for a vehicle velocity that is less than a second velocity (such as 100 km/h), and a fixed portion in which the velocity lower-limit value is set so as to be fixed for a vehicle velocity that is equal to or greater than the second velocity.

In addition, a plurality of corresponding relationships between the vehicle velocity of the vehicle 80 and the velocity lower-limit value may be provided. In this case, the reference velocity calculating unit 27 may calculate the reference velocity using the corresponding relationship that is appropriate based on a traveling state of the vehicle 80. For example, the traveling state may be a state in which the vehicle 80 is traveling through an urban area, a state in which the vehicle 80 is traveling on an expressway, or the like.

Next, at S110, the aliased velocity calculating unit 28 calculates (n+1) aliased velocities that are the reference velocity calculated by the reference velocity calculating unit 27 aliased (folded) 0 to n times, n being a natural number, in a positive direction. According to the present embodiment, as shown in FIG. 8, the aliased velocity calculating unit 28 calculates an aliased velocity (that is, the reference velocity) that is the reference velocity aliased zero times in the positive direction, an aliased velocity that is the reference velocity that is aliased once in the positive direction, and an aliased velocity that is the reference velocity that is aliased twice in the positive direction. Then, the aliased velocity calculating unit 28 generates three target candidates that respectively correspond to the calculated three aliased velocities and registers the three target candidates.

At this time, the aliased velocity calculating unit 28 excludes the target candidate that corresponds to the aliased velocity that is equal to or greater than a velocity upper-limit value set in advance, from the generated three target candidates. The velocity upper-limit value is set to a positive value and is set to eliminate a target that has an unlikely relative velocity.

For example, as shown in FIG. 9, a corresponding relationship between the vehicle velocity of the vehicle 80 and the velocity upper-limit value may have a fixed portion in which the velocity upper-limit value is set so as to be fixed over the overall range of the vehicle velocity. In addition, as shown in FIG. 10, the corresponding relationship may have an inversely proportional portion in which the velocity upper-limit value is set so as to decrease with increase in the vehicle velocity for a vehicle velocity that is less than the first velocity, and a fixed portion in which the velocity upper-limit value is set so as to be fixed for a vehicle velocity that is equal to or greater than the first velocity. Furthermore, as shown in FIG. 11, the corresponding relationship may have an inversely proportional portion in which the velocity upper-limit value is set so as to decrease with increase in the vehicle velocity over the overall range of the vehicle velocity. After the process at S110, the aliased velocity calculating unit 28 returns to S70.

<3. Effects>

According to the present embodiment described above, following effects are achieved.

(1) The aliased velocity that is equal to or greater than the velocity lower-limit value that is set based on the vehicle velocity of the vehicle 80 and is most negative or smallest in magnitude is calculated as the reference velocity. Furthermore, (n+1) aliased velocities that are the reference velocity that is aliased 0 to n times in the positive direction are calculated, and (n+1) target candidates that correspond to the (n+1) aliased velocities are generated. As a result, the (n+1) aliased velocities over an appropriate range based on the vehicle velocity of the own vehicle 80 can be calculated. Consequently, estimation accuracy regarding a true relative velocity can be improved while processing load is suppressed. Furthermore, lack of recognition of an object can be suppressed while processing load is suppressed.

(2) As a result of the velocity lower-limit value being set to a negative value, the velocity lower-limit value becomes the relative speed of an object that is approaching the vehicle 80. Consequently, an object that is approaching the vehicle 80 can be recognized.

(3) As a result of the velocity lower-limit value being set to be equal to or less than a negative value of the vehicle velocity of the vehicle 80, a stationary object can be recognized.

(4) As a result of the velocity lower-limit value being set so as to decrease with increase in the vehicle velocity of the vehicle 80, an object that has a likelihood of colliding with the vehicle 80 can be recognized.

(5) As a result of the corresponding relationship between the vehicle velocity of the vehicle 80 and the velocity lower-limit value having a portion in which the velocity lower-limit value has an inversely proportional relationship with the vehicle velocity, an object that has a likelihood of colliding with the vehicle 80 can be accurately recognized.

(6) A target candidate that corresponds to an aliased velocity that is equal to or greater than the set velocity upper-limit value is excluded from the generated plurality of target candidates. As a result of a target candidate that has an unlikely relative velocity being excluded, processing load can be reduced.

(7) As a result of the velocity upper-limit value being set to a positive value, the relative velocity Vobs=0 is included between the velocity lower-limit value and the velocity upper-limit value. Consequently, an object (specifically, a leading vehicle) that is moving in the same direction at the same velocity as the vehicle 80 can be recognized.

Other Embodiments

An embodiment for carrying out the present disclosure is described above. However, the present disclosure is not limited to the above-described embodiment and can be modified in various ways.

(a) According to the above-described embodiment, the vehicle 80 is described as an example of the moving body. However, the moving body is not limited to the vehicle 80 and may be a motorcycle, a ship, an airplane, or the like. In addition, the radar apparatus 10 is not limited to the millimeter-wave radar and may be a laser radar or the like.

The object tracking apparatus 20 and the method thereof described in the present disclosure may be actualized by a dedicated computer that is provided so as to be configured by a processor and a memory, the processor being programmed to provide one or a plurality of functions that are realized by a computer program. Alternatively, the object tracking apparatus 20 and the method thereof described in the present disclosure may be actualized by a dedicated computer that is provided by a processor being configured by a single dedicated hardware logic circuit or more. As another alternative, the object tracking apparatus 20 and the method thereof described in the present disclosure may be actualized by a single dedicated computer or more. The dedicated computer may be configured by a combination of a processor that is programmed to provide one or a plurality of functions, a memory, and a processor that is configured by a single hardware logic circuit or more. In addition, the computer program may be stored in a non-transitory computer-readable storage medium that can be read by a computer as instructions performed by the computer. A method for actualizing functions of sections that are included in the object tracking apparatus 20 is not necessarily required to include software. All of the functions may be actualized using a single or a plurality of pieces of hardware.

(c) A plurality of functions provided by a single constituent element according to the above-described embodiment may be actualized by a plurality of constituent elements. A single function provided by a single constituent element may be actualized by a plurality of constituent elements. In addition, a plurality of functions provided by a plurality of constituent elements may be actualized by a single constituent element. A single function provided by a plurality of constituent elements may be actualized by a single constituent element. Furthermore, a part of a configuration according to the above-described embodiment may be omitted. Moreover, at least a part of a configuration according to an above-described embodiment may be added to or replace a configuration according to another of the above-described embodiments.

(d) The present disclosure can also be actualized by various modes in addition to the above-described object tracking apparatus, such as a system in which the object tracking apparatus is a constituent element, a program for enabling a computer to function as the object tracking apparatus, a non-transitory computer-readable storage medium such as a semiconductor memory that records the program therein, and an object tracking method.

What is claimed is:

1. An object tracking apparatus comprising:
    an acquiring unit that is configured to acquire detection information from a sensor that is mounted to a moving body;
    an object detecting unit that is configured to detect an object that is present in a vicinity of the moving body from the detection information that is acquired by the acquiring unit;
    a distance calculating unit that is configured to calculate a distance of the object that is detected by the object detecting unit;
    a velocity calculating unit that is configured to calculate a relative velocity of the object that is detected by the object detecting unit;
    an orientation calculating unit that is configured to calculate an orientation of the object that is detected by the object detecting unit;
    a candidate generating unit that, for the object that is initially detected by the object detecting unit, is configured to calculate a plurality of aliased velocities of which aliasing from the relative velocity that is calculated by the velocity calculating unit is assumed, and is configured to generate a plurality of target candidates that correspond to the plurality of aliased velocities;
    a state estimating unit that, for each target candidate that is included in the plurality of target candidates that are generated by the candidate generating unit, is configured to estimate a current state of the target candidate from a past state of the target candidate and observation information, in which the observation information includes the distance that is calculated by the distance calculating unit, the relative velocity that is calculated by the velocity calculating unit, and the orientation that is calculated by the orientation calculating unit; and
    a candidate selecting unit that is configured to select the target candidate that is estimated to be a true target from the plurality of target candidates that are generated for a same object by the candidate generating unit, wherein
    the candidate generating unit includes
        a reference velocity calculating unit that is configured to calculate, as a reference velocity, an aliased velocity of the relative velocity that is calculated by the velocity calculating unit that is equal to or greater than a velocity lower-limit value and is most negative or smallest in magnitude, the velocity lower-limit value being set based on a movement velocity of the moving body, and
        an aliased velocity calculating unit that is configured to calculate the plurality of aliased velocities that are the reference velocity that is calculated by the reference velocity calculating unit that is aliased 0 to n times, n being a natural number, in a positive direction.

2. The object tracking apparatus according to claim 1, wherein:
    the velocity lower-limit value is set to a negative value.

3. The object tracking apparatus according to claim 2, wherein:
    the velocity lower-limit value is set to be equal to or less than a negative value of the movement velocity.

4. The object tracking apparatus according to claim 3, wherein:
    the velocity lower-limit value is set so as to decrease with increase in the movement velocity.

5. The object tracking apparatus according to claim 4, wherein:
    the velocity lower-limit value has, in a corresponding relationship between the movement velocity and the velocity lower-limit value, a portion in which the velocity lower-limit value has an inversely proportional relationship with the movement velocity.

6. The object tracking apparatus according to claim 5, wherein:
    the candidate generating unit is configured to exclude a target candidate that corresponds to the aliased velocity that is equal to or greater than a set velocity upper-limit value from the generated plurality of target candidates.

7. The object tracking apparatus according to claim 6, wherein:
    the velocity upper-limit value is set to a positive value.

8. The object tracking apparatus according to claim 1, wherein:
    the velocity lower-limit value is set to be equal to or less than a negative value of the movement velocity.

9. The object tracking apparatus according to claim 1, wherein:
the velocity lower-limit value is set so as to decrease with increase in the movement velocity.

10. The object tracking apparatus according to claim 1, wherein:
the velocity lower-limit value has, in a corresponding relationship between the movement velocity and the velocity lower-limit value, a portion in which the velocity lower-limit value has an inversely proportional relationship with the movement velocity.

11. The object tracking apparatus according to claim 1, wherein:
the candidate generating unit is configured to exclude a target candidate that corresponds to the aliased velocity that is equal to or greater than a set velocity upper-limit value from the generated plurality of target candidates.

12. The object tracking apparatus according to claim 11, wherein:
the velocity upper-limit value is set to a positive value.

13. An object tracking apparatus comprising:
a processor;
a non-transitory computer-readable storage medium; and
a set of computer-executable instructions stored on the computer-readable storage medium that when read and executed by the processor, that cause the processor to implement:
acquiring detection information from a sensor that is mounted to a moving body;
detecting an object that is present in a vicinity of the moving body from the acquired detection information;
calculating a distance of the detected object, a relative velocity of the detected object, and an orientation of the detected object;
calculating, for the object that is initially detected by the object detecting unit, a plurality of aliased velocities of which aliasing from the calculated relative velocity is assumed, and generating a plurality of target candidates that correspond to the plurality of aliased velocities;
estimating, for each target candidate that is included in the generated plurality of target candidates, a current state of the target candidate from a past state of the target candidate and observation information that includes the calculated distance, the calculated relative velocity, and the calculated orientation;
selecting the target candidate that is estimated to be a true target from the generated plurality of target candidates for a same object;
calculating, as a reference velocity, an aliased velocity of the calculated relative velocity that is equal to or greater than a velocity lower-limit value and is most negative or smallest in magnitude, the velocity lower-limit value being set based on a movement velocity of the moving body; and
calculating the plurality of aliased velocities that are the calculated reference velocity that is aliased 0 to n times, n being a natural number, in a positive direction.

14. An object tracking method comprising:
acquiring detection information from a sensor that is mounted to a moving body;
detecting an object that is present in a vicinity of the moving body from the acquired detection information;
calculating a distance of the detected object, a relative velocity of the detected object, and an orientation of the detected object;
calculating, for the object that is initially detected by the object detecting unit, a plurality of aliased velocities of which aliasing from the calculated relative velocity is assumed, and generating a plurality of target candidates that correspond to the plurality of aliased velocities;
estimating, for each target candidate that is included in the generated plurality of target candidates, a current state of the target candidate from a past state of the target candidate and observation information that includes the calculated distance, the calculated relative velocity, and the calculated orientation;
selecting the target candidate that is estimated to be a true target from the generated plurality of target candidates for a same object;
calculating, as a reference velocity, an aliased velocity of the calculated relative velocity that is equal to or greater than a velocity lower-limit value and is most negative or smallest in magnitude, the velocity lower-limit value being set based on a movement velocity of the moving body; and
calculating the plurality of aliased velocities that are the calculated reference velocity that is aliased 0 to n times, n being a natural number, in a positive direction.

* * * * *